(No Model.)
T. L. ALLEN.
FERTILIZER DISTRIBUTER.
No. 336,373. Patented Feb. 16, 1886.
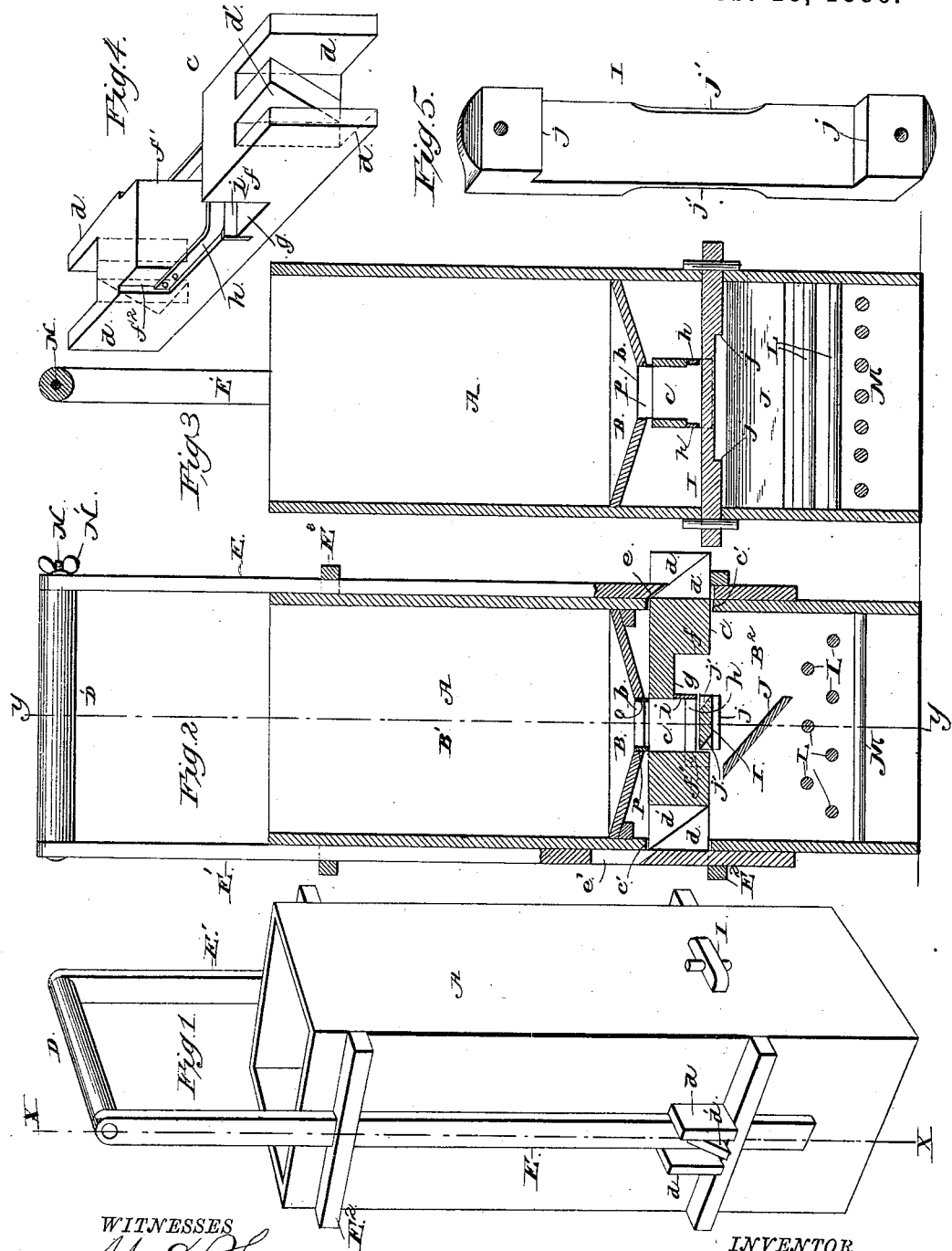
WITNESSES
INVENTOR
Thomas L. Allen
By
Attorneys

UNITED STATES PATENT OFFICE.

THOMAS LEIGHTON ALLEN, OF EAST WINDHAM, MAINE.

FERTILIZER-DISTRIBUTER.

SPECIFICATION forming part of Letters Patent No. 336,373, dated February 16, 1886.

Application filed October 28, 1885. Serial No. 181,178. (No model.)

*To all whom it may concern:*

Be it known that I, THOMAS L. ALLEN, a citizen of the United States, residing at East Windham, in the county of Cumberland and State of Maine, have invented a new and useful Improvement in Fertilizer-Distributers, of which the following is a specification, reference being had to the accompanying drawings.

My invention has relation to improvements in fertilizer-distributers; and it consists of the peculiar construction and combination of parts, substantially as hereinafter fully described, and specifically pointed out in the claims.

The object of my invention is to provide a fertilizer-distributer to be operated by hand and secure an even and regular discharge to each hill, which shall be simple and strong in construction, thoroughly effective, and rapid in its operation, which can be adjusted to vary the quantity of fertilizer sown or distributed, which can be readily taken apart for adjustment and repairs, and which can be manufactured very cheaply.

In the drawings, Figure 1 is a perspective view of my improved hand fertilizer-distributer. Fig. 2 is a vertical sectional view on the line $x$ $x$ of Fig. 1. Fig. 3 is a similar sectional view on the line $y$ $y$ of Fig. 2. Fig. 4 is a detail perspective view of the reciprocating slide or cut-off. Fig. 5 is a detail perspective view of the adjustable stop.

Referring to the drawings, in which like letters of reference indicate corresponding parts in all the figures, A designates the inclosing case or shell of my improved hand fertilizer-distributer, which has open ends, and provided with a horizontal transverse partition, B, secured therein at or near its middle, and dividing the shell or casing into two compartments, B' B². The upper compartment, B', serves as a hopper, in which the fertilizer or other substance to be distributed is deposited, while the lower compartment receives the distributing devices for evenly distributing the fertilizer on its passage from the hopper to the ground. The partition or bottom of the hopper B is made sloping from all sides toward its middle, and is provided with a discharge-opening, $b$, through which the fertilizer passes.

C designates a reciprocating slide or cut-off, arranged beneath the bottom of the hopper, and having an opening, $c$, which successively registers and is thrown out of coincidence with the opening $b$ of the hopper-bottom when the slide or cut-off is reciprocated to permit the passage of the fertilizer therethrough and cut off the supply from the hopper. The ends of the reciprocating slide C bear in openings $c'$ in the walls of the casing or shell A, and are each provided with three arms or projections, $d$ $d$ $d'$, which serve, in connection with vertically-moving handle-bars, to operate the slide back and forth, as will presently more fully appear.

D designates the handle, arranged above the case A and secured to handle-bars E E', which are arranged on opposite sides of the case A and slide between guide-bars E², secured to said case A above and beneath the reciprocating slide C. The arms $d$ $d$ of the outer ends of the reciprocating slide have the handle-bars E E' arranged between them and serve as guides to said bars, while the arms $d'$ of said slide are beveled in opposite directions, and project through slots $c'$ $c'$ in said handle-bars, which successively operate to move the slide back and forth when they are moved up and down. The beveled arms $d'$ of the slide thus serve as cams to reciprocate the same, one of the arms being beveled downwardly and outwardly from its upper inner edge to its lower outer edge, and the slot $e$ of the handle-bar E has its upper wall beveled in opposite directions, (see Fig. 2,) so that when the said bar E descends the beveled surface of the slot is brought into contact with the beveled arm $d'$, to force the slide in one direction, the two surfaces sliding upon each other easily and freely with a minimum of friction and wear. The opposite beveled arm of the slide that is acted on by the handle-bar E' is beveled from its outer upper edge inwardly and downwardly, and the lower wall of the slot $e'$ of said bar is beveled in the reverse direction, for the purpose of decreasing friction on the parts in contact. It will thus be seen that when the handle-bars are drawn upwardly the bar E' is brought into engagement with one of the beveled arms $d'$ of the slide C and forces the same inwardly to bring the aperture $c$ thereof to register with the opening $b$ in the hopper-bottom, to permit the discharge of the fertilizer through the said openings $c$ $b$, and when the handle-bars are forced downwardly the bar E serves to force the slide in the opposite direction to throw the apertures thereof out of coincidence with the opening of the hopper-bottom to cut off the discharge, said slide being thus successively or alternately brought into position or engagement with the handle-bars E and E' to reciprocate the same.

The under surface of the reciprocating slide is cut away at the point where the discharge port or opening $c$ is formed therein, thus forming two shoulders, $f f'$, at each side and at or near its middle. Immediately to one side of the discharge-port $c$ is another cut-away portion, $g$.

$h$ designates a removable band, arranged immediately beneath the discharge-port $c$, and depending downwardly from the lower surface of the surrounding walls thereof, the ends of said band being secured to recessed portions $f^2$ of the shoulder $f'$ by screws or otherwise.

$i$ designates a transverse strip, arranged at one side of the discharge-opening $c$ of the slide, to clear away the fertilizer which is liable to accumulate and clog up on the adjustable stop-bar I, presently described.

The adjustable stop bar or plate I is arranged transversely across the reciprocating slide $c$ between the shoulders $f f'$ thereof, and at its ends said stop I is supported in the walls of the case A by any suitable or preferable means. The outer ends of said bar or stop are provided with shoulders $j$ on one surface thereof, and the side edges of the said bar are beveled off in opposite directions, as at $j'$.

J designates an inclined discharge-board, secured in the walls of the case beneath the stop I, to properly guide or direct the fertilizer to the ground.

L designates diagonally-arranged cross-bars, secured in the case A, near its lower end, beneath the inclined discharge-board, and M is a series of parallel cross-bars arranged below and transversely of the diagonal cross-bars, said parallel and diagonal bars serving to thoroughly and evenly distribute the fertilizer falling thereon from the hopper and discharge-board.

The lower surface of the stop is on a plane above the lower surface of the reciprocating slide, thus leaving a small space between the upper surface of the said stop and the removable band $h$, and when the parts are in these positions only a limited quantity of fertilizer is discharged or permitted to pass from the slide onto the upper surface of the cross bar or stop I, from whence it is scraped by the band $h$ during the movement of the said slide. If it is desired to increase the quantity of fertilizer to be discharged, the band $h$ is removed and the bar I reversed in position—that is to say, the said bar is withdrawn from the case A and turned so that the shoulders $j$ are uppermost, thus causing the middle portion of said bar to lie at a greater distance from the lower surface of the reciprocating slide. An enlarged space is thus provided for the escape of the fertilizer from between the slide and the stop, and the material resting on the bar is prevented from accumulating to such a degree to stop the slide by the cross plate or strip $i$.

The operation of my invention is obvious. The fertilizer is first placed in the hopper and the handle grasped by the operator. The lower open end of the case A is set on the ground at the place where the fertilizer is to be deposited, and the handle and bars E are pressed downwardly, thus causing the discharge-port of the slide to register with the opening in the bottom, and permitting the fertilizer to escape and fall down on the stop and the inclined discharge-board, and from thence to the distributing-bars L M. The case or shell A is now lifted from the ground by pulling upward on the handle D, and the weight of the device and the pull on the handle-bars serve to force the slide back to its normal position, so that the discharge is cut off until the device is again rested on the ground and the handle depressed.

The handle D is removably secured to the bars E E' by means of a headed through-bolt, N, and a thumb-screw, N', to permit said bars E E' to be readily detached from said handle to permit the slide C to be removed from the case A, for the purpose of removing or attaching the band $h$ when it is desired to vary the quantity of fertilizer to be distributed.

The discharge-opening $b$ of the hopper-bottom has a clearing-strip, $o$, to prevent the substance or fertilizer from clogging on the upper surface of the reciprocating slide: and said discharge-opening is further provided, on its opposite side, with a flexible or elastic strip, $p$, to prevent a bone or other hard unyielding substance in the fertilizer from injuring the slide or bottom of the hopper and preventing it from working. When a bone or other hard substances in the fertilizer clogs up the opening therein, the elastic strip will yield when the reciprocating slide is operated, and thus permit the bone, &c., to pass through the hopper or become discharged.

Having thus fully described my invention, what I claim as new, and desire to secure by Letters Patent, is—

1. The combination of a case having a hopper, a transverse slide arranged beneath the same, and vertically-moving handle-bars loosely mounted on the case and adapted to reciprocate the slide when they are moved up and down, substantially as described.

2. The combination of a case having a hopper, a reciprocating slide mounted in the case and arranged beneath the discharge-opening of the hopper-bottom, said slide having guide and cam arms at its ends, and slotted handle-bars alternately engaging the cam-arms of the slide to reciprocate the same, substantially as described.

3. The combination of a case having a hopper, a transversely-moving slide having limiting shoulders or stops, vertically-moving handle-bars to operate said slide, and a transverse stop-bar adapted to engage the shoulders of the slide to limit the movement thereof, substantially as described.

4. The combination of a case having a hopper, a reciprocating slide having limiting-shoulders, vertically-moving handle-bars to operate the slide, and a reversible stop-bar to limit the movement of the slide and vary the quantity of material discharged, substantially as described.

5. The combination of a case having a hopper, a reciprocating slide, a removable band, $h$, secured thereto, vertically-moving handle-bar to operate the slide, and a stop-bar to limit the movements of the slide, substantially as described.

6. The combination of the case having a hopper, a reciprocating slide, handle-bars for operating the same, a removable band, $h$, secured to and surrounding the discharge-opening of the slide, and a reversible stop-bar adapted to limit the movement of the slide, substantially as described.

7. The combination of the case having a hopper, a horizontally-movable slide, vertically-movable handle-bars connected with the slide and adapted to reciprocate the same, a transverse bar for limiting the movement of the slide, an inclined discharge board located beneath the slide and supported on or near the middle of the case, and separating-bars arranged below the discharge-board, substantially as described.

8. The combination of the case having a hopper, a movable slide having an opening, and a detachable band, $h$, surrounding said opening, a reversible transverse bar for limiting the movement of the slide and having offsets at its ends, vertically-movable handle-bars for operating the slide, an inclined discharge-board, and separating-bars located below the discharge-board, substantially as described.

In testimony that I claim the foregoing as my own I have hereto affixed my signature in presence of two witnesses.

THOMAS LEIGHTON ALLEN.

Witnesses:
MARGIE I. WHITNEY,
FLORENCE I. ALLEN.